April 29, 1947.  R. K. McCLINTOCK  2,419,689
GAS TURBINE
Filed Nov. 5, 1942  4 Sheets-Sheet 1

INVENTOR
Raymond K. McClintock
BY
Bean, Brooks, Buckley & Bean.
ATTORNEYS

April 29, 1947.  R. K. McCLINTOCK  2,419,689
GAS TURBINE
Filed Nov. 5, 1942  4 Sheets-Sheet 2
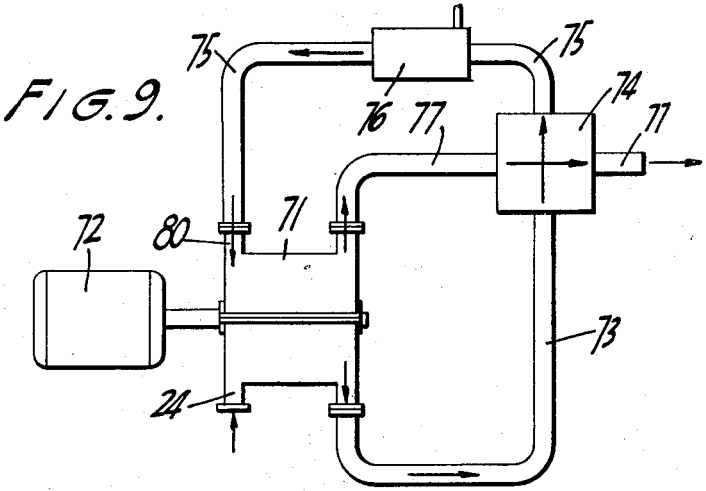
FIG. 9.
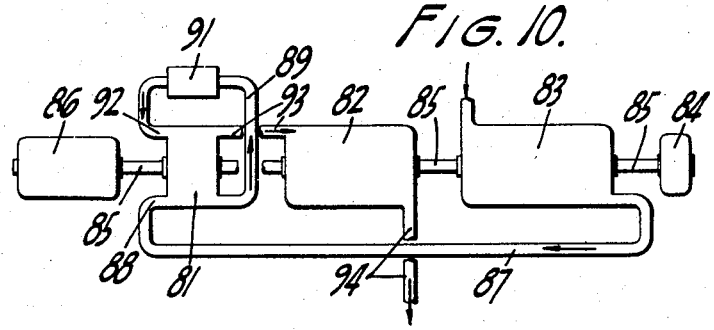
FIG. 10.
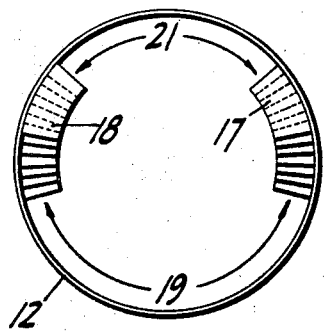
FIG. 2.
FIG. 3.
INVENTOR
Raymond K. McClintock
BY
Bean, Brooks, Buckley & Bean
ATTORNEYS

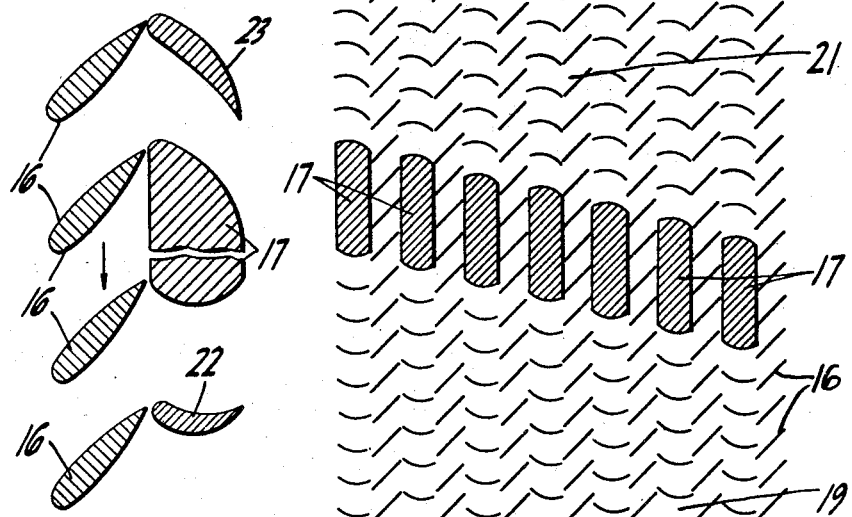
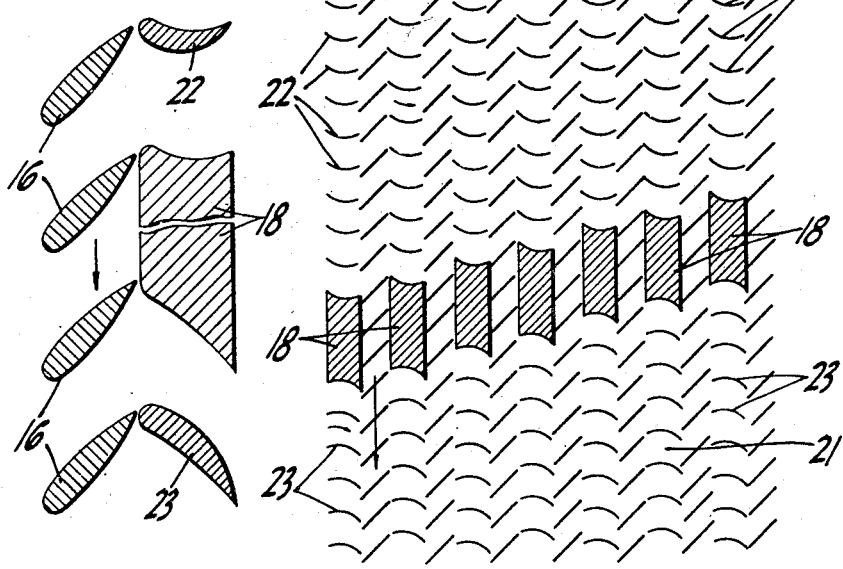
Fig. 6.
INVENTOR
Raymond K. M<sup>c</sup>Clintock

Patented Apr. 29, 1947

2,419,689

UNITED STATES PATENT OFFICE 2,419,689

GAS TURBINE

Raymond K. McClintock, Emporium, Pa.

Application November 5, 1942, Serial No. 464,569

5 Claims. (Cl. 60—41)

The present invention relates to heat engines of the type commonly known as the axial flow continuous combustion gas turbine, or simply axial flow gas turbine. The term axial flow refers to turbines and compressors wherein the general flow is in the direction of the axis of rotation, it being understood that such flow may be in a straight line or in a helical path or in a path undulating as it progresses in the direction of the axis. In the cycle of operation of such a gas turbine, air, which is commonly used as the working substance, is drawn from the atmosphere and compressed in an axial flow compressor to a higher pressure and temperature. Heat is then added to the air, the latter remaining at substantially constant pressure but increasing in volume, and the heat addition being accomplished either by passing the compressed air through heated conduits or, generally, by the simpler process of injecting fuel into the air and burning it.

The products of combustion and any excess air mixed therewith then expand through the axial flow turbine and discharge at lower pressure and temperature, generally to the atmosphere.

In the present state of the art one of the outstanding disadvantages of the combustion turbine is the limitation of turbine inlet temperature to regions substantially below that of the products of combustion due to the inability of existing materials suitable for rotor blade and spindle constructions to withstand higher temperatures, and particularly due to the "creep" in the blade and spindle material when subjected to such higher temperatures. With the stator blades and casing of the turbine the problem is not so great since they need not be designed to withstand the forces of rotation and are more easily cooled, if desired.

Because of temperature limitations, the turbine inlet temperatures have been restricted, in the case of direct fuel injection by cooling the products of combustion by supplying an excess of air to the system in or adjacent to the combustion chamber. This procedure is inefficient thermodynamically, as well as demanding increase in the physical size of the turbine and compressor units without any increase in the net work output.

The present invention overcomes this obstacle, in systems of the foregoing types and similar systems, by providing a gas turbine and an air compressor, so combined that the rotor is common to both devices, and thus in each revolution its blades will be acted upon by the hot gases and also will act upon the relatively cooler air being compressed. The resultant decrease in the blade temperature from that of the hot working substance enables the utilization of higher turbine inlet temperatures, accompanied by increased thermodynamic efficiency and greater net work output, without exceeding the temperatures which the rotor construction will withstand.

The foregoing and other objects and advantages will become apparent from the following description of the typical embodiments of the invention shown in the accompanying drawings, wherein:

Fig. 2 is an end view of the stator casing with the stator blades omitted, showing the disposition of partition members which separate the expansion section of the unit from the compression section thereof;

Fig. 3 is a perspective view of one of the partition members;

Figs. 4 and 5 are fragmentary cross-sectional views of adjacent stator and rotor blades with partition members disposed between the stator blades of the expansion and compression sections of the unit;

Fig. 6 is a schematic view showing the relation of the rotor and stator blades, and the partition members in a seven stage machine;

Fig. 9 is a side elevation of a combination expansion-compression turbine unit similar to that of Fig. 1 but provided with a heat exchange device utilizing the heat from the expansion chamber exhaust for pre-heating the compressed air taht is to enter the combustion chamber;

Fig. 10 is a side elevational view of an arrangement combining a combination unit with a conventional axial flow turbine and axial flow compressor; and, Fig. 11 is a longitudinal sectional view of a supercharger drive turbine for internal combustion engines employing the principles of the invention.

Figure 1:
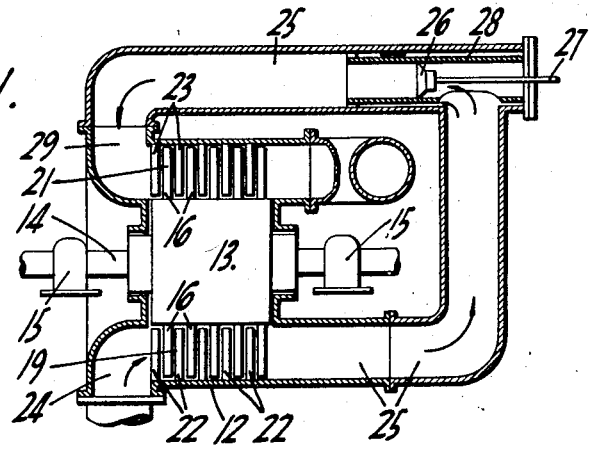
Fig. 1 is a schematic longitudinal sectional view through a single unit arranged to constitute both an axial flow turbine and an axial flow compressor.

As shown in Figs. 1 and 2 the unit may comprise a stationary casing 12 and a rotor 13 carried on a shaft 14 mounted in bearings 15. The rotor is provided with a plurality of axially spaced rows or stages of radially extending blades 16. These may be of the cross section shown in Figs. 4 and 5 or of other desired cross section. The working space in the casing is divided by partition members 17 and 18 into a compression section 19 and an expansion section 21, the partition members being disposed in such relation axially of the casing that each set of rotor blades may pass between adjacent partitions in traveling from space 19 to space 21 and again in traveling from space 21 into space 19 as the rotor turns.

Extending radially from the casing 12 into the compression space 19 are stator blades 22. These may be of the form shown in Figs. 4 and 5 or of other cross sections depending upon the designed conditions, and they lie in the transverse planes of the partitions 17 and 18, one set being disposed in advance of each set of rotor blades. Similar stator blades 23 of suitable cross section for the particular machine extend from the casing into the work space 21 in advance of each set of rotor blades, the blades 23 of course lying in the same transverse planes as the blades 22.

Air is drawn into the compression space 19 through inlet 24, the moving rotor blades 16 cooperating with stator blades 22 to effect the induction of air and its compression in the space 19, the pressure of the air being increased progressively as the air passes each successive stage of blades. The compressed air is discharged into conduit 25 in which is disposed a burner 26 for fuel injected through a conduit 27. The fuel may be of any suitable type, such as oil or powdered coal, and when burned in the compressed air, further heats the latter. As shown in Fig. 1 the burner may be surrounded by a refractory sleeve 28, and a portion of the air not used in the combustion process may pass between the sleeve and the adjacent walls of conduit 26 to protect the latter from excessive temperatures. The compressed and heated air, including the gases of combustion, pass from conduit 25 and through inlet 29 into the working space 21. In the latter the air expands progressively as it passes from stage to stage, its energy being imparted to the rotor blades 16 which it drives.

Since the compressed air is heated by combustion with fuel prior to entering working space 21, the energy there released by expansion is greater than that required for compressing the air in working space 19. Consequently the work done in space 21 is greater than that done in space 19, and the excess work may be utilized by an electric generator or other device connected mechanically to the shaft 14.

As the same rotor blades pass through both working spaces 19 and 21 their temperatures will be approximately a mean of the temperatures of the air in those spaces, and since the air in the compressor space 19 is of much lower temperature than the maximum that the blades 16 will satisfactorily withstand, the temperature of the air entering through inlet 29 may be much higher than such maximum, increasing the thermodynamic efficiency and making possible the combustion of a greater portion of the compressed air, thereby decreasing the dimensions of the machine for a given power output.

As the air is compressed in working space 19 its volume will decrease, requiring that the working space be of smaller cross section at the discharge end than at the inlet end. Similarly the expansion in space 21 requires that this space be of greater cross section at the exhaust end than at the inlet. This is accomplished by progressively varying the width of the expansion and compression spaces in the different stages of the machine, the arrangement being schematically shown in Fig. 6 for a seven-stage turbine-compressor unit. The necessary staggering of the partitions 17 and 18 is also illustrated in Fig. 2.

A further result of the described arrangement is that the rotor blade temperatures in the several stages are maintained substantially uniform. For example, the rotor blades in the first stage are exposed to the hottest turbine inlet gases through a short arc of travel and to the fresh incoming air at the compressor inlet for a relatively long arc of travel, whereas the rotor blades in the last stage are exposed through substantially equal arcs of travel to the exhaust gases cooled by expansion in the expansion phase and to the hottest compressed gases at the last stage of the compression phase. It will thus be seen that the rotor blade temperatures in all stages will not vary widely in degree.

It will be seen that the rotor blades 16, when passing through the expansion space 21, are acted upon by the working fluid, to effect rotation, and when passing through the compression space 19, act upon working fluid to compress it. This, of course, requires that blades 16 meet the fluid at different angles of attack in the two working spaces, and is accomplished by making the stator blades 23 and 22 of different forms, as is best shown in Figs. 4, 5 and 6. It will be understood, of course, that the blade shapes depicted are merely illustrative and in practice will be modified to meet the particular design conditions.

The partitions 17 and 18 are provided to prevent, insofar as possible, the intermixture of working fluids in the two chambers 19 and 21, and to this end the clearance between the rotor blades 16 and the partitions is preferably kept as close as possible. However, as the axial velocity of the fluid is high in a machine of this type there will be little tendency for such intermixture. The width of the partitions, that is, their dimensions between spaces 19 and 21, should be such that there can be no direct flow of fluid between the rotor inter-blade spaces from space 21 to space 19 or from space 19 into space 21. The volume of fluid in the inter-rotor blade spaces between the partitions, which is carried from one working space into the other, will be small since such fluid will be substantially enclosed and will have no substantial axial velocity, and the power loss from this source will therefore be in inverse ratio to the fluid velocity in the working spaces.

Figure 7:
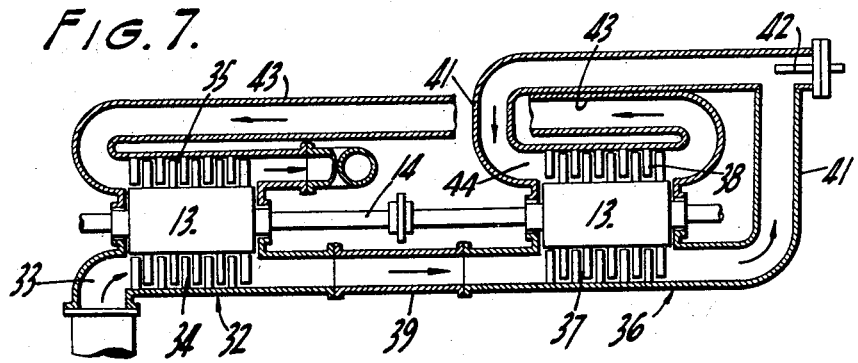
Fig. 7 is a view similar to Fig. 1 depicting a modified arrangement wherein two combination expansion-compression turbine units are disposed in tandem to enable a reduction of the pressure differential between the expansion and compression sections of each unit.

In order to further minimize intermixture of air between the compression space and the expansion space, the arrangement depicted in Fig. 7 may be employed. In this arrangement a plurality of turbine-compressor units (two in the illustrated embodiment) are disposed in tandem. The first unit 32 has air inlet 33, a compression space 34 separated by suitable partitions 17 and 18 (not shown in Fig. 7) from expansion working space 35, while the second unit, 36, likewise has separated compression and expansion spaces 37 and 38, respectively. Air induced through inlet 33 is compressed in space 34, and is then passed through a conduit 39 to compression space 37 of the second unit where it is further compressed. The exhaust from space 37, in conduit 41, is heated by the combustion of fuel injected at 42 and is then entered through inlet 44 into expansion space 38 of the second unit where it partially expands. The exhaust from space 38 passes through conduit 43 to the inlet of the expansion chamber 35 of the first unit, where the remaining expansion takes place. Assuming that half of the compression and expansion takes place in each of the two units, it will be seen that the pressure differential between the expansion space and the compression space for any stage of each unit will be only approximately half of that existing in the arrangement shown in Fig. 1, provided that the same maximum pressure is employed in the two arrangements, and therefore, a much lower loss due to intermixture of gas undergoing compression with gas undergoing expansion will occur due to leakage past the partition members.

Figure 8:
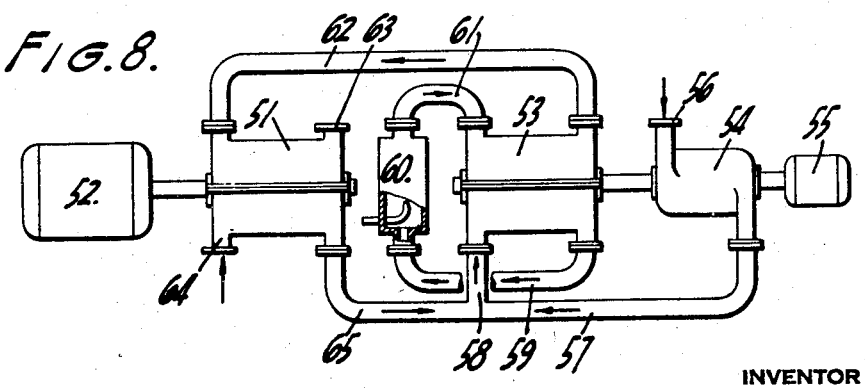
Fig. 8 is a side elevation of another modification wherein one combination expansion-compression turbine unit is adapted to be operated at constant speed and constant load, and a second combination unit arranged in tandem with the first is adapted to drive a varying load.

In the arrangement shown in Fig. 8 two compressor-expansion turbine units are employed to provide a system having greater flexibility of power output. The first unit, 51, operates a varying load represented by generator 52. The second unit 53 comprises a constant speed, constant load unit, connected mechanically to a compressor 54, which may be of the axial flow type, and a starting motor 55. Air entering inlet 56 of compressor 54 is exhausted into conduit 57 from which it may pass through branch 58 into the compression space of unit 53 where it is further compressed. It is then exhausted through conduit 59 into combustion chamber 60 where its temperature is increased by the burning of fuel. The heated working fluid passes through conduit 61 into the inlet of the expansion space of unit 53, exhausting therefrom through conduit 62 into the expansion chamber of the unit 51 where further expansion takes place, final exhaust being through outlet 63. Air entering inlet 64 of the compression chamber of unit 51 exhausts through branch 65 of conduit 57, passing through branch 58 of the latter into the compression space of unit 53. Since unit 51 is being driven by the exhaust gases of unit 53 its turbine inlet temperature is substantially lower than that of unit 53 and for that reason less cross sectional area is necessary for its compression section in order to cool the rotor blades, enabling an increase in the net useful work output of the unit. Further, the starting motor 55 need be large enough only to set unit 53 into operation.

In Fig. 9 is illustrated at 71 a combination expansion-compression turbine unit similar to that shown in Fig. 1, arranged to drive a generator 72. The exhaust from the compression section of the unit is passed by a conduit 73 through a heat exchanger 74, thence through conduit 75 in which combustion chamber 76 is provided into the inlet 80 of the expansion section of the unit. Exhaust of gases from the expansion section is through conduits 77 which carry the gases through the heat exchanger. In this way heat residual in the turbine exhaust gases may be utilized by being transferred to the air compressed in the compressor section of the unit before such air is heated in the combustion chamber.

Fig. 10 illustrates a combined expansion-compression turbine unit 81 associated with a conventional gas turbine 82 and compressor 83, both of which are preferably of the axial flow type. In this arrangement the three units are shown as being mechanically connected by shafting 85 to a starting motor 84 and an electric generator 86. Air compressed in compressor 83 is introduced through a conduit 87 to the inlet 88 of the compression section of unit 81 where the air is further compressed, exhausting therefrom through conduit 89 into combustion chamber 91.

The heated fluid from the chamber 91 passes into inlet 92 of the expansion chamber of unit 81, and after passing the latter enters through conduit 93 into the gas turbine 82, exhausting from the turbine 82 through pipe 94.

With this arrangement the very hot gases leaving the chamber 91 are cooled by expansion in the motor or expansion space of unit 81 before entering the gas turbine 82, to a temperature which the rotor blades of turbine 82 will withstand. The temperature of the fluid at inlet 92 may be much higher, of course, since the rotor blades of unit 81 subjected to this fluid will be cooled by passing during part of each rotation through the compression zone of unit 81, where the fluid temperatures are relatively low. By employing the conventional gas turbine 82 for utilizing that part of the expansion occurring in a temperature range at or below the maximum which its rotor will withstand, there will be no losses in this stage due to intermixing of fluids in different phases of the cycle, such as will occur in systems consisting only of one or more combination compression-expansion turbine units.

Figure 11:
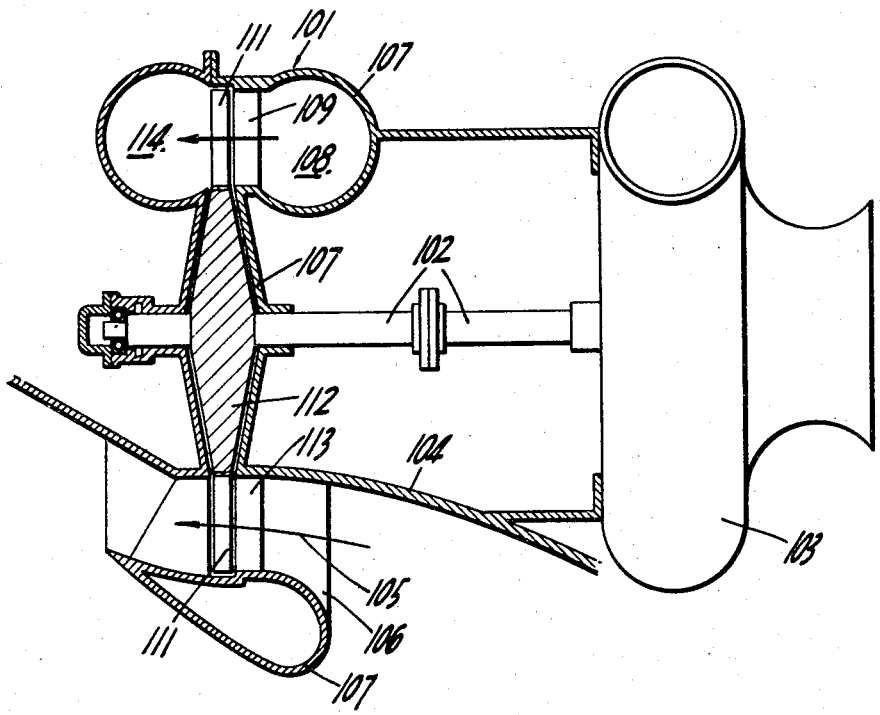

In the embodiment of the invention shown in Fig. 11 a turbine unit 101 is provided for driving, through shafting 102, a supercharger 103 of any suitable type for an internal combustion engine, particularly an aircraft engine, the unit 101 employing the exhaust of such engine as a source of energy. The assembly may be mounted upon the fuselage, engine nacelle, or other suitable part of the aircraft or other structure, indicated by numeral 104, in such manner that air or other gaseous fluid moving at high velocity, such as the slipstream in the case of an aircraft, will pass as indicated by arrow 105 through a guiding orifice 106 formed in a part of the turbine casing 107 that projects beyond member 104 into the fluid stream.

Engine exhaust gases are conducted to inlet chamber 108 of the casing 107, and there are directed by stator blades 109 against blades 111 of the turbine rotor 112 before discharging into the atmosphere via exhaust chamber 114. The rotor blades 111, during a portion of each revolution, pass through the orifice 106, where the fluid stream 105 is directed over them by stator blades 113. In this way the temperatures of the rotor blades may be reduced to a degree which they will satisfactorily withstand.

It is to be understood that the stator blades 109 and the stator blades 113 each occupy arcuate sectors of predetermined angular extent but that such sectors are substantially separated by partition members analogous to the partition members 17 and 18 of the previously described embodiments.

By designing the form of stator blades 113 to secure the desired angle of attack of fluid 105 relative to the rotor blades, the latter may serve either to accelerate the flow through orifice 106 or may be acted upon by the fluid 105 to impart further energy to the rotating assembly, or may be neutral, neither accelerating nor retarding flow of fluid 105 through orifice 106.

It will be understood that in this embodiment of the invention, as in those described hereinbefore, the degree of cooling of the rotor blades may be varied to meet design conditions by varying the arc of travel of the blades in contact with the fluid at high temperature relative to the arc of travel in contact with fluid at lower temperature.

It will be understood further that the embodiments herein shown and described are merely illustrative of the principles involved, and that these may be incorporated in other forms and arrangements without departing from the spirit of the invention or the scope of the appended claims.

The principles of the present invention may be adapted to combinations wherein there is interstage heating in the turbine section and interstage cooling in the compressor section. It is further contemplated that the principles may be applied in connection with multiple regeneration heat exchangers and other conventional devices for increasing the efficiency of apparatus of the kind here under consideration.

What is claimed is:

1. In an axial flow gas turbine, a casing, a rotor having a plurality of radially extending blades thereon, means associated with said casing including an inlet at one side of the blades and an outlet at the other side of the blades for passing fluid axially past said blades during a portion of each revolution thereof for effecting compression of such fluid, means for heating the fluid discharged from said outlet, and means associated with said casing including a second inlet at said one side of the blades and a second outlet at said other side of the blades for directing the heated fluid against said blades during another portion of each revolution thereof for driving the rotor, the flow of fluid between both of said inlets and said outlets being in substantially the same direction.

2. In an axial flow gas turbine, a casing and a bladed rotor mounted therein, said casing having a compression space and an expansion space, and provided with an inlet and an outlet for each of said spaces, the inlets being at one end of said casing and the outlets at the opposite end thereof whereby the flow of fluid through said spaces is in substantially the same direction, the blades of the rotor during a portion of each revolution passing through said compression space to effect compression of fluid therein and during another portion of each revolution passing through said expansion space for being acted upon by the expansion of fluid therein for driving said rotor, and means for heating the compressed fluid discharged from the outlet of the compression space and conducting the compressed and heated fluid to the inlet of the expansion space.

3. In an axial flow gas turbine, a casing and a bladed rotor mounted therein, said casing having a compression space and an expansion space, and provided with an inlet and an outlet for each of said spaces, the inlets being at one end of said casing and the outlets at the opposite end thereof whereby the flow of fluid through said spaces is in substantially the same direction, the blades of the rotor during a portion of each revolution passing through said compression space to effect compression of fluid therein and during another portion of each revolution passing through said expansion space for being acted upon by the expansion of fluid therein for driving said rotor, means for conducting fluid from the outlet of the compression space to the inlet of the expansion space, and means for injecting and igniting fuel in the fluid in the conducting means for increasing the temperature thereof at substantially constant pressure.

4. In an axial flow gas turbine, a casing and a rotor mounted therein, said casing having a compression space and a substantially diametrically opposed expansion space defined by substantially the same radii as the compression space with respect to the axis of the turbine, and having a plurality of axially arranged stages of radially disposed stator blades in each of said spaces, the stator blades in the compression space being disposed in substantially the same transverse planes as the stator blades in the expansion space, partition members disposed in said transverse planes between the compression stator blades and the expansion stator blades, said rotor having a plurality of stages of radially disposed blades arranged to operate between the stator blades and partition members of adjacent stages, the rotor blades during a portion of each revolution passing through the compression space for cooperation with the compression stator blades to effect the movement and compression of fluid, and during another portion of each revolution passing through the expansion space for being acted upon by expanding fluid directed by the expansion stator blades for driving the rotor.

5. In an axial flow gas turbine, a casing and a rotor mounted therein, said casing having a compression space and an expansion space, and having a plurality of axially arranged stages of radially disposed stator blades in each of said spaces, the stator blades in the compression space being disposed in substantially the same transverse planes as the stator blades in the expansion space, partition members disposed in said transverse planes between the compression stator blades and the expansion stator blades, said rotor having a plurality of stages of radially disposed blades arranged to move between the stator blades and partition members of adjacent stages, the rotor blades during a portion of each revolution passing through the compression space for cooperation with the compression stator blades to effect the movement and compression of fluid, and during another portion of each revolution passing through the expansion space for being acted upon by expanding fluid directed by the expansion stator blades for driving the rotor, the partitions of successive stages being staggered to progressively decrease the area of the compression space toward the outlet thereof and to progressively increase the area of the expansion space toward the outlet thereof.

RAYMOND K. McCLINTOCK.

REFERENCES CITED

The following references are of record in the file of this patent:

UNITED STATES PATENTS

| Number | Name | Date |
|---|---|---|
| 1,829,749 | Holzwarth | Nov. 3, 1931 |
| 894,409 | Toms | July 28, 1908 |
| 2,095,991 | Lysholm | Oct. 19, 1937 |
| 2,245,954 | Anxionnaz | June 17, 1941 |
| 2,286,940 | Trumpler | June 16, 1942 |
| 2,138,220 | Trumpler | Nov. 29, 1938 |
| 1,580,878 | Dufour | Apr. 13, 1926 |
| 864,399 | Wing | Aug. 27, 1907 |

FOREIGN PATENTS

| Number | Country | Date |
|---|---|---|
| 825,164 | French | Feb. 24, 1938 |
| Add. 4,328 | French | Apr. 18, 1905 |
| 2,818 | British | Feb. 5, 1906 |